United States Patent [19]
DuPuit

[11] Patent Number: 5,638,942
[45] Date of Patent: Jun. 17, 1997

[54] SCRAPER, SCRAPING FRAMEWORK THUS EQUIPPED, MATERIALS TRANSFER INSTALLATION AND MOVEABLE CELLULAR BOOTH

[75] Inventor: Gérard DuPuit, Villepatour, France

[73] Assignee: Getrasur, Presles-en-Brie, France

[21] Appl. No.: 481,332

[22] PCT Filed: Jan. 5, 1994

[86] PCT No.: PCT/FR94/00013

§ 371 Date: Jul. 3, 1995

§ 102(e) Date: Jul. 3, 1995

[87] PCT Pub. No.: WO94/15861

PCT Pub. Date: Jul. 21, 1994

[30] Foreign Application Priority Data

Jun. 1, 1993 [FR] France ................... 93 00065

[51] Int. Cl.⁶ ................................................ B65G 25/04
[52] U.S. Cl. ................................. 198/747; 198/749
[58] Field of Search ............................. 198/719, 749, 198/747, 741, 727, 734, 736, 738

[56] References Cited

U.S. PATENT DOCUMENTS

| | | | |
|---|---|---|---|
| 4,250,988 | 2/1981 | Miaskoff | 198/719 |
| 5,199,549 | 4/1993 | Lutke | 198/520 |

FOREIGN PATENT DOCUMENTS

| | | | |
|---|---|---|---|
| 2074586 | 10/1971 | France . | |
| 2160062 | 6/1973 | France . | |
| 2343672 | 10/1977 | France . | |
| 2380107 | 9/1978 | France . | |
| 2579571 | 10/1986 | France . | |
| 2655031 | 5/1991 | France | 198/749 |
| 765898 | 3/1953 | Germany . | |
| 320422 | 1/1972 | U.S.S.R. | 198/734 |
| WO91/13014 | 9/1991 | WIPO . | |

*Primary Examiner*—D. Glenn Dayoan
*Attorney, Agent, or Firm*—Young & Thompson

[57] ABSTRACT

A scraper (14) arranged between two parallel side members (12) of a scraper frame, having a metal structure (51) in the shape of a comb (52) with teeth facing downwards and a flexible blade (59) covering the teeth (52) and bonded to the structure (51). A first portion (51a) of the structure (51) is perpendicular to the longitudinal members (12) and at least a second portion (51b) integral with an end of the first portion (51a) forms an elbow with the latter, the flexible blade (59) being bonded to the elbows's inward facing surface. The invention is for use especially in blasting plants using powder or granular materials.

18 Claims, 5 Drawing Sheets

SCRAPER, SCRAPING FRAMEWORK THUS EQUIPPED, MATERIALS TRANSFER INSTALLATION AND MOVEABLE CELLULAR BOOTH

The present invention concerns a scraper intended in particular for the transfer of pulverulent or granular materials.

It also concerns a scraping framework which includes a series of scrapers according to the invention and in which the introduction of the materials to be transferred is performed laterally with respect to the scraping framework.

Furthermore, the present invention concerns a pulverulent or granular materials transfer installation, in particular for the recovery of blasting materials such as sand, using two scraping frameworks according to the invention.

Finally, the object of this invention is a moveable cellular booth for an external site, comprising a materials transfer installation in accordance with the invention.

In many industries, certain manufacturing stages need to have at their disposal, at ground level, installations for the transfer of pulverulent or granular materials in order to be able to recover the latter or to eliminate them.

French patent FR 2 655 031 filed by the applicant already describes a scraper including a comb-shaped metal truss and a flexible elastomer blade glued against one face of an upper crossbar of the truss. This patent also describes a scraping framework including several scrapers arranged transversally between two parallel girders and performing a back and forth movement so as to transfer the materials, such as blast sand, contained within recovery chutes.

These scrapers are only active in one direction of displacement, when the displaced material pushes the flexible blade against the metal truss.

The scraping frameworks are arranged parallel to one another on the ground of user installations. At their materials discharge end, they open into a transversal chute equipped with an identical scraping framework located beneath the longitudinal chutes in such a way that the material accumulated at the ends falls into the transversal chute. The latter generally opens into the base of a recycling device such as a bucket elevator.

Such installations require a significant amount of foundation work, in particular the digging of a pit in the ground in order to arrange the transversal chutes at a lower level, beneath the longitudinal chutes.

Likewise, the base of the elevator must be driven into the ground so as to be located beneath the transversal chutes.

The purpose of the present invention is to eliminate the above-mentioned disadvantages of installations for the transfer of pulverulent or granular materials by means of a swinging movement. In particular, it makes it possible to simplify the setting up of these installations and to make their use far more flexible.

The scraper which the invention is concerned with is arranged between two parallel girders and comprises a metal truss in the shape of a comb whose teeth are directed downwards and a flexible blade covering said teeth and glued against one face of an upper crossbar of the truss.

According to the invention, the scraper is characterised in that the metal truss has a first part substantially perpendicular to said girders and at least one second part joined to one end of the first part and forming an elbow with the first part, the flexible blade being glued against one face directed towards the interior of the truss's elbow.

The elbowed structure of the scraper makes it possible to displace the granular or pulverulent materials slantwise within the scraping framework and to bring back the materials so that they are facing the first part of the truss, perpendicular to the girders.

The scraper according to the invention thus makes it possible to eliminate the excess of materials on the sides of the scraping framework.

According to a second aspect of the invention, a scraping framework comprises two parallel girders between which are arranged scrapers in accordance with the invention performing a back-and-forth movement, the materials to be transferred being introduced laterally into said scraping framework, beneath at least one of the girders.

The scraping framework is characterised in that a second part of the elbowed truss of each scraper is adjacent to the girder beneath which the materials to be transferred are introduced, with the face directed towards the interior of the truss's elbow facing the materials discharge end of said framework.

Thus, the scraping framework according to the invention makes it possible to transfer the materials in a direction perpendicular to the direction in which the products are introduced. Due to the bent structure of the scrapers and their arrangement within the parallel girders, the materials introduced beneath a girder, on the sides of the scraping framework, are quickly deviated towards the middle of the framework. Thus, there is no accumulation of materials along the girders of the scraping framework upon the change in the direction of the transfer of materials.

According to a third aspect of the invention, the installation for the transfer of materials, in particular granular or pulverulent blasting materials, comprises a first series of parallel scraping frameworks including two parallel girders which perform a back-and-forth movement and between which straight scrapers are arranged transversally, and a second scraping framework in accordance with the invention.

According to the invention, this installation is characterised in that the scraping frameworks of said first series open laterally into the second scraping framework, the straight scrapers of the first series of scraping frameworks having a straight metal truss in the shape of a comb whose teeth are directed downwards, a flexible blade covering said teeth and glued to one face of an upper crossbar of the truss, and a stiffening flange substantially perpendicular to the upper crossbar and extending opposite to the flexible blade in the end scrapers arranged facing the second scraping framework.

The blasting materials transfer installation according to the invention thus allows for an arrangement on the same level of the longitudinal and transversal scraping frameworks. Due to the invention, it is no longer necessary to carry out costly and tedious foundation work in order to install the scraping frameworks.

Furthermore, since the latter are arranged directly on the ground, their disposition can be easily adjusted according to the requirements of the machine shops.

According to a fourth aspect of the invention, a moveable cellular booth comprises a materials transfer installation such as described above, the scraping frameworks of the first series and said second scraping framework including fixed external sections between which the girders extend parallel to one another.

According to the invention, the external sections include fixing means suited to fix in a releasable manner said cellular booth extending above the scraping frameworks, the booth including an opening suited for the passage of a discharge end portion of the second scraping framework.

This cellular booth thus makes up a blasting assembly which can be installed without requiring foundations, outdoors, for example near the machine shops or yards. It is easily moveable and can be displaced from site to site, according to the use required.

Further advantages and features of the invention will appear in the following description, which refers to the attached drawings provided by way of example on a non-limiting basis:

Figure 1:
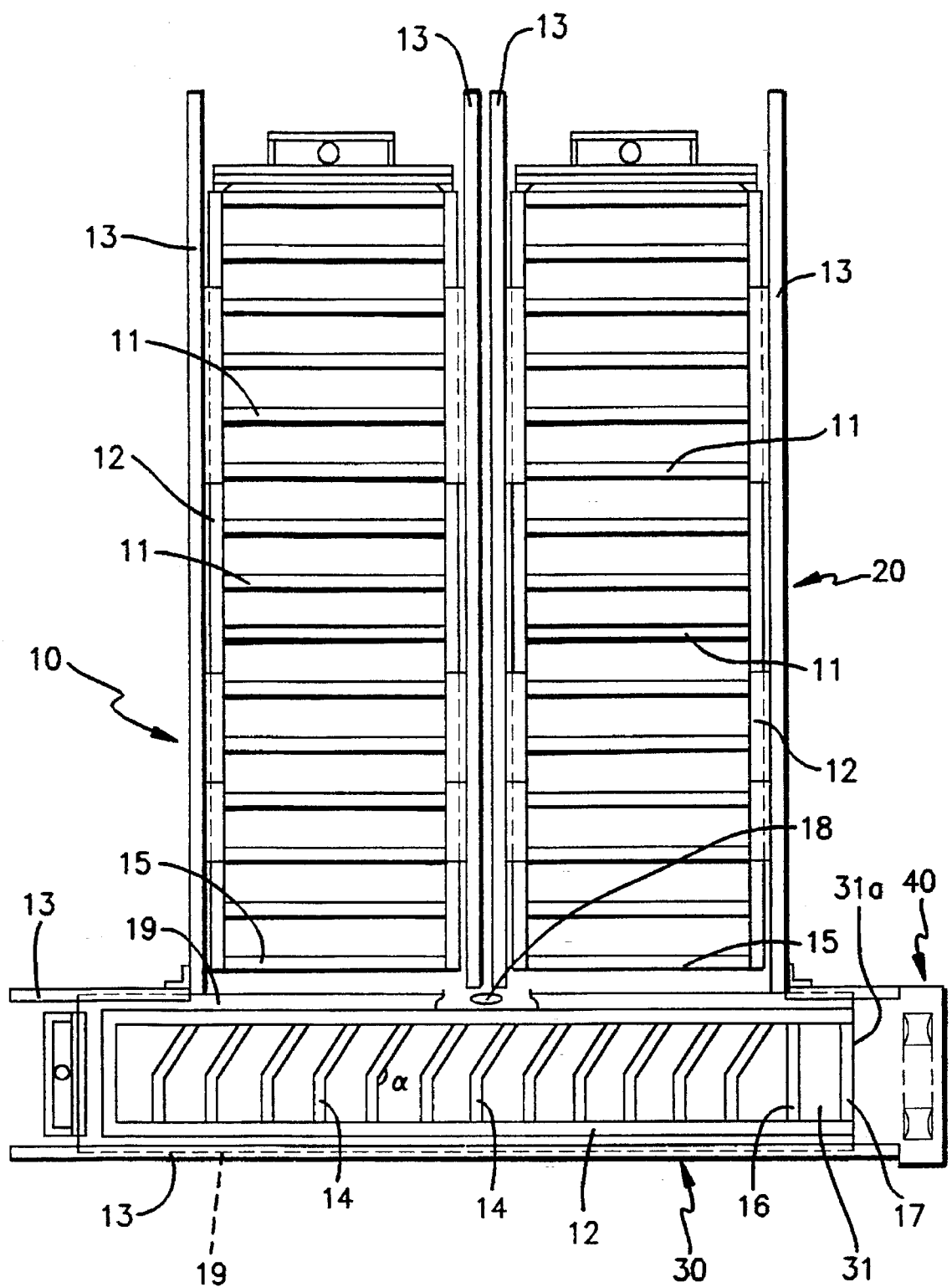
FIG. 1 is a general view of an installation for the recovery of materials according to the invention.

As shown in FIG. 1, the scraper 14 according to the invention is arranged between two parallel girders 12.

Figure 2:
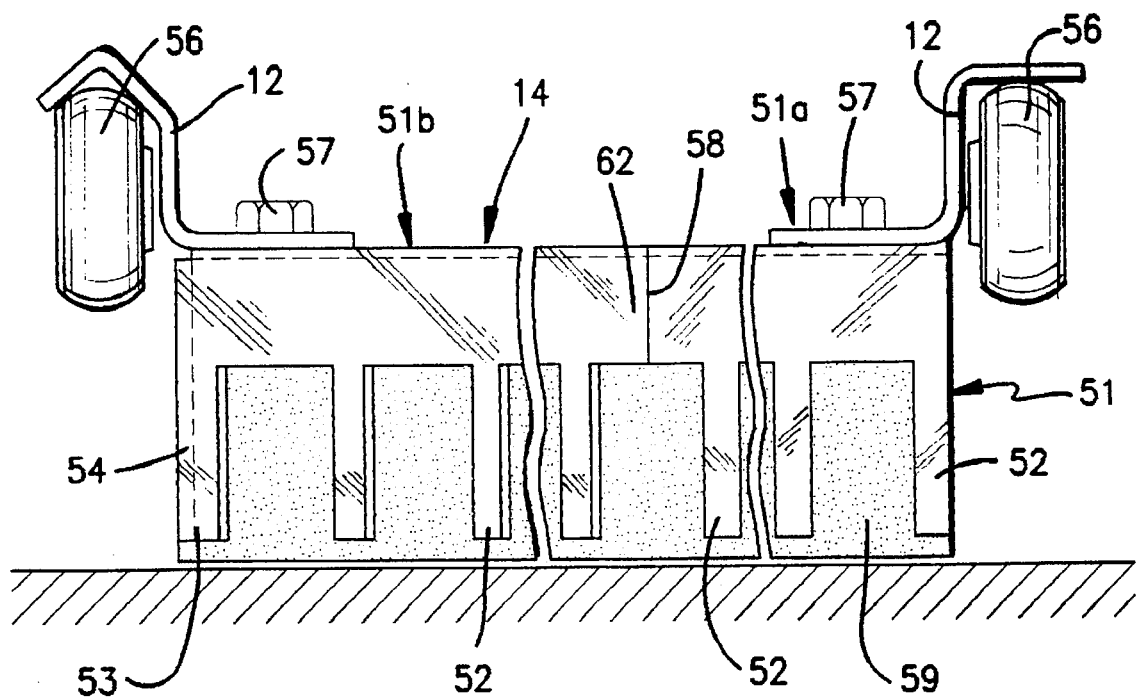
FIG. 2 is a front view of a scraper according to the invention.
Figure 3:
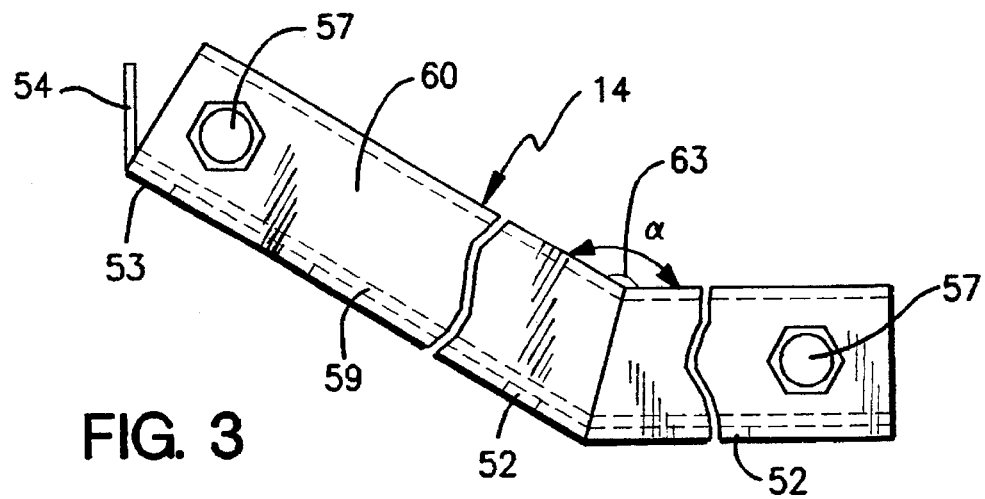
FIG. 3 is a top view of a scraper according to the invention.

The scraper 14 comprises a metal truss 51, shown in FIGS. 2 and 3, in the shape of a comb with its teeth 52 directed downwards and a flexible blade 59 covering the teeth 52. The blade 59 can be made of elastomer or rubber. It is glued against one face of the upper crossbar 62 of the truss 51. In the case where the blade 59 is made of elastomer, the glue used is preferably a cyanoacrylate glue.

The scraper 14 has a first part 51a of the truss which is perpendicular to the girders 12 and a second part 51b of the truss which is joined to one end of the first part 51 and which forms an elbow with the latter.

In the example of an embodiment shown in FIG. 3, the two parts 51a and 51b of the metal truss 51 form an obtuse angle a equal to approximately 150°. The value of the inclination of the second part 51b of the truss with respect to the first part 51a results from a compromise between the need to have a high inclination in order to quickly deviate the material towards the first part 51a of the truss and the concern for not increasing the length of the pitch between each scraper 14 by an exaggerated amount in order to have a sufficient number of scrapers 14 for an adequate transfer of the materials in the scraping framework 30.

The flexible blade 59 is glued against the face directed towards the interior of the elbow of the truss 51, i.e. the concave face of the truss, so that the active direction of the back-and-forth movement of the scraper 14 corresponds to the direction of the displacement of the scraper in which the scraper's first face is the concave face.

The second part 51b of the truss has a flange 54 joined to its end opposite to the first part 51a. This flange 54 is parallel to the girders 12 and extends beyond the flexible blade 59. This flange 54 serves as a cutting edge and makes it possible, upon each back-and-forth movement of the scraper, to keep the materials from being driven beneath the girder 12 and to guide them towards the scraper 14. This flange 54 can have a thickness of approximately 2.5 mm and it can extend a length of 20 mm from the end of the truss 51. This flange 54 also makes it possible to maintain the flexible blade 59 against the truss 51 by keeping the materials from penetrating laterally between the truss 51 and the flexible blade 59.

The metal truss 51 in the shape of a comb has teeth 52, 53 at its ends, in particular so as to avoid, upon each return of the scraper 14 following an active displacement of the latter, that the flexible blade 59 be lifted by the materials introduced laterally into the scraping framework 30.

The teeth 52 have a width of 8 mm and are spaced by approximately 25 mm. Preferably, the end tooth 53 adjacent to the flange 54 has a width slightly superior to that of the other teeth 52, equal to approximately 9 mm.

The scraper 14 thus has an end part formed by the flange 54 and the end tooth 53, which is reinforced in the area where the materials to be transferred are introduced, i.e. in the part of the scraping framework where the materials are present in greatest quantity.

The first 51a and second 51b parts of the truss 51 are in contact on a vertical plane 58 located between two teeth 52 of the comb.

The flexible blade 59 thus correctly takes the shape of the concave face of the metal truss 51.

As shown in FIG. 3, the metal truss 51 also has a stiffening flange 60 which is substantially perpendicular to the upper crossbar 62 and extends over the edge of the flexible blade 59 adjacent to the upper crossbar of the truss.

This stiffening flange 60 has fixing means 57 fixing it to the parallel girders 12. The scraper 14 can therefore be joined to the two parallel girders 12 by means of a screw-nut system. The stiffening flange 60 is also solidified at the vertical plane of contact 58 between the two parts 51a and 51b of the truss by a weld point 63.

The scrapers 14 are arranged between two parallel girders 12 which can be displaced in a back-and-forth movement on rollers 56. The alternative movement is obtained in a known manner with a geared motor and a connecting rod (not shown). The mounting of the rollers 56 on the sections 13 is also achieved in a known manner by means of mountings 19 fixed to the sections 13, which are placed on the ground, and it is described in detail in patent FR-2 655 031 filed by the applicant.

The second part 51b of each scraper 14 is adjacent to the girder 12 beneath which the materials to be transferred are introduced, with the face directed towards the interior of the elbow of the truss 12 facing the materials discharge end 31 of the scraping framework 30.

The materials transfer installation shown in FIG. 1 comprises two longitudinal scraping frameworks 10 and 20 parallel to one another. Each framework 10, 20 includes two parallel girders 12 between which straight scrapers 11, 15 performing a back-and-forth movement are transversally arranged.

Figure 6:
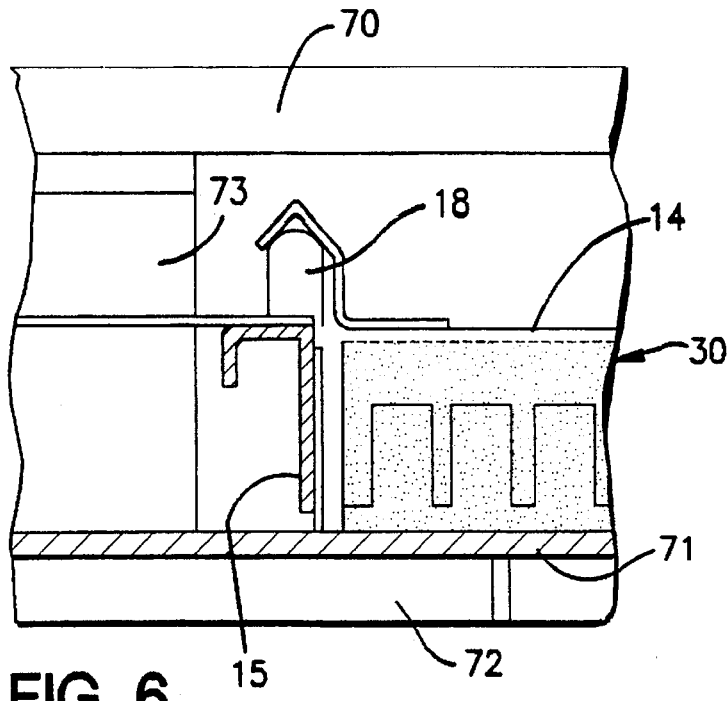
FIG. 6 is a partial sectional view taken along line VI—VI of FIG. 5.

The installation also includes a transversal scraping framework 30 into which the longitudinal scraping frameworks 10 and 20 open laterally. The transversal scraping framework 30 includes elbowed truss scrapers 14 arranged between the girders 12 in the portions of the transversal scraping framework 30 into which open the longitudinal scraping frameworks 10 and 20. The latter comprise straight scrapers 11, 15 which, in a known manner, are made up of a straight metal truss in the shape of a comb with its teeth directed downwards, a flexible blade covering the comb's teeth and glued to one face of an upper crossbar of the truss, and a stiffening flange substantially perpendicular to the upper crossbar. This stiffening flange extends opposite to the flexible blade in the end scrapers 15 arranged facing the transversal scraping framework 30, as shown in FIG. 6.

The section 13 of the transversal scraping framework 30 finishes off in front of the longitudinal scraping frameworks 10 and 20 so as to not impede the transfer of materials at ground level at the intersection of the longitudinal scraping frameworks 10, 20 and the transversal scraping framework 30. Only mounting 19 extends throughout the entire length of the lateral scraping framework. This mounting 19 is suspended above the ground, at its ends, to the section 13 finished off and it is supported by an intermediate roller 18 placed between the two longitudinal scraping frameworks 10, 20 in an area where the materials are not present.

Due to the specific structure of the end scrapers 15 of the longitudinal scraping frameworks described above, the action of the scraper 15 on the materials to be transferred takes place beneath the mounting 19. The materials thus routed are then carried away by the flanges 54 forming a cutting edge of the scrapers 14 of the transversal scraping framework and are then deviated by the elbowed shape of the trusses 51 of the scrapers 14.

The transversal scraping framework 30 opens into the base of an elevator 40 of bucket elevator type. This elevator makes it possible to recover the materials transferred by the scraping installation and to possibly recycle them.

The transversal scraping framework 30 has a materials discharge end portion 31, a series of straight scrapers 16, 17 including a metal truss in the shape of a comb with its teeth directed downwards, a flexible blade covering these teeth and glued against one face of the upper crossbar of the truss, and a stiffening flange substantially perpendicular to the upper crossbar.

Due to the elbowed scrapers 14 and despite the fact that the transversal scraping framework 30 is supplied with materials through one side of this framework 30, the materials are uniformly distributed throughout the width of the scraping framework 30 near its materials discharge end 31a. The end portion 31 can therefore be equipped with straight scrapers 16 and 17.

Figure 4:
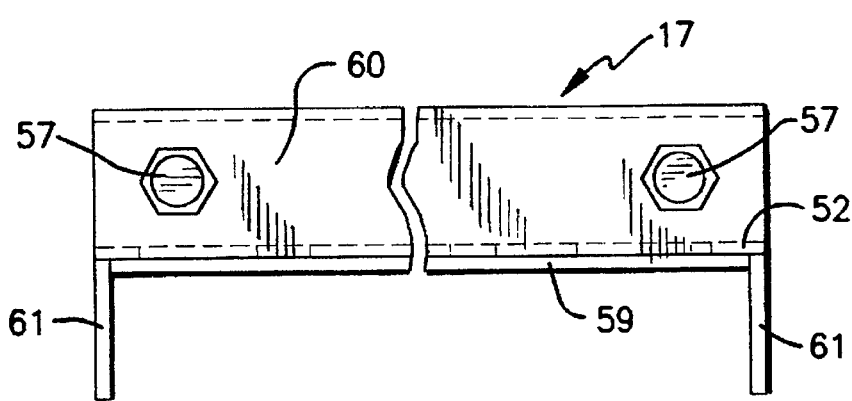
FIG. 4 is a top view of an end scraper of the scraping framework according to the invention.

The end scraper 17 shown in FIG. 4 has a stiffening flange 60 extending opposite to the flexible blade 59 and the truss 51 of this end scraper 17 comprises at its ends two flanges 61 parallel to the girders 12 and extending beyond the flexible blade 59.

These flanges 61 serve as a crammer for the elevator 40 and keep the materials form getting jammed at the base of the elevator 40.

Figure 5:
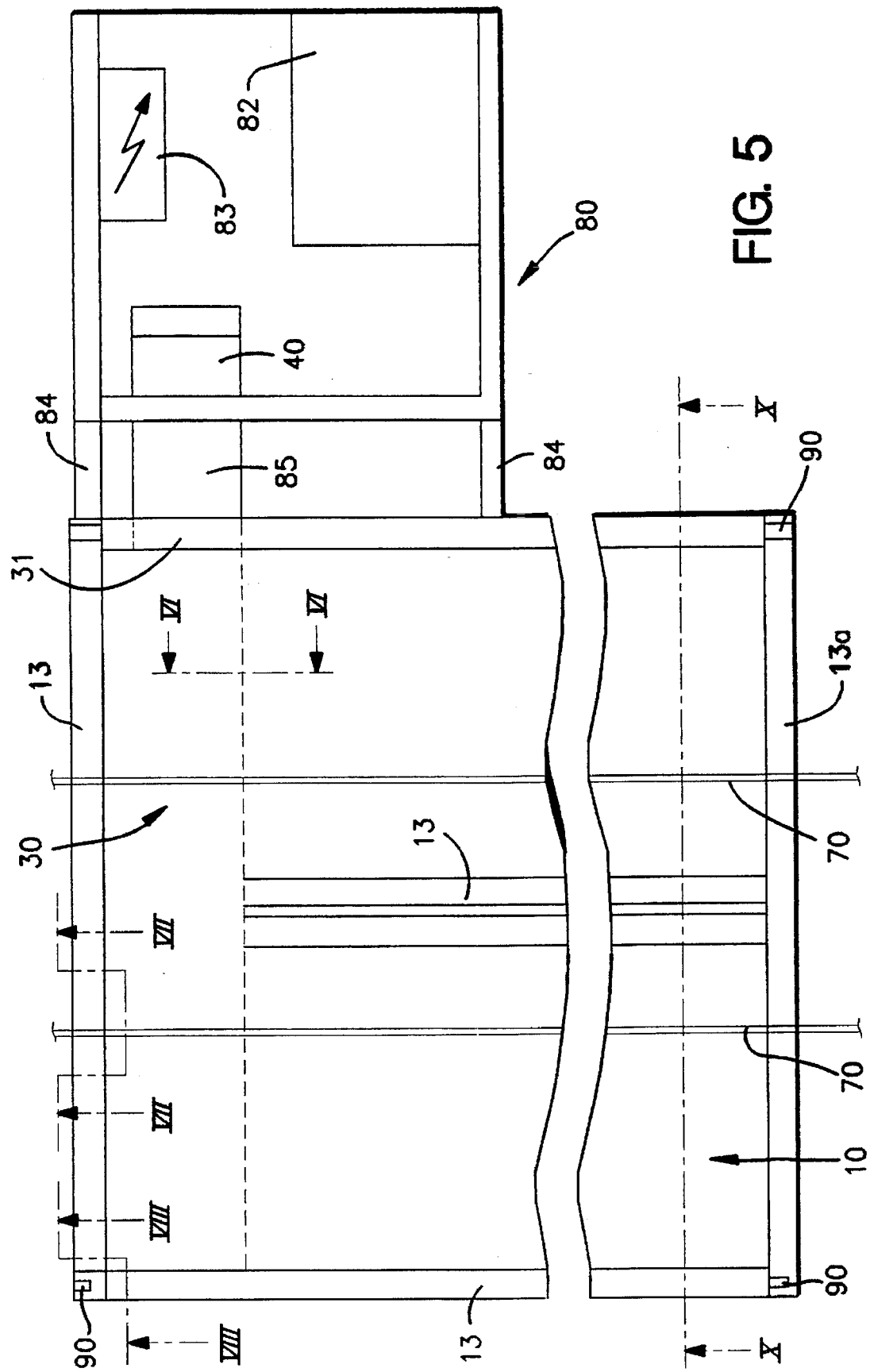
FIG. 5 is a truncated plan view at ground level of the cellular booth according to the invention.

As shown in FIG. 5, the cellular booth comprises a materials transfer installation such as described above including two or more longitudinal scraping frameworks 10, 20 and a transversal scraping framework 30 equipped with bent scrapers 14 in accordance with the present invention.

Each scraping framework 10, 20 and 30 includes fixed external sections 13, 13a between which extend the girders 12.

As shown in FIG. 1, sections 13 extend parallel to the girders 12 and are suited to support, by means of a mounting 19, rollers enabling the back-and-forth translation of the girders with respect to the sections 13.

A section 13a, arranged transversally with respect to the longitudinal scraping frameworks 10 and 20, is suited to close off the end of these frameworks 10, 20 opposite to the transversal scraping framework 30.

According to the invention, these external sections 13, 13a include fixing means 90 suited to fix in a releasable manner a booth 100 extending above the scraping frameworks 10, 20 and 30.

Figure 11:
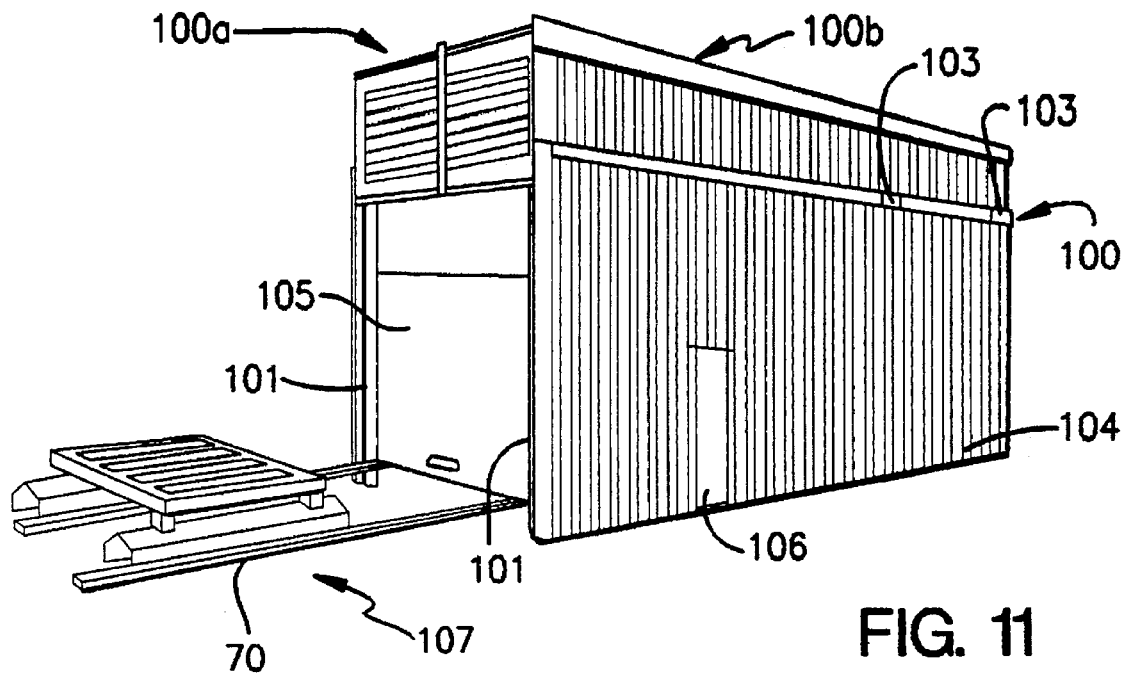
FIG. 11 is a perspective view of a cellular booth of the blasting assembly.

As shown in FIG. 11, this booth includes an opening 104 suited for the passage of a discharge end portion 31 of the second scraping framework 30.

The booth 100 can thus be mounted directly onto the materials transfer installation without it being necessary to previously perform foundation work.

Such a blasting assembly can thus be placed outdoors without the slightest problem, near a plant or a yard, to perform the sand blasting or shot blasting of the various pieces.

Since the cellular booth can be easily disassembled, its transfer from one place to another can be carried out without any difficulties or special transportation, etc.

As an example, four trucks or containers are required to displace such a cellular booth and the assembly time amounts to approximately four days.

The cellular booth includes at least one rail 70 substantially parallel to the girders 12 of the first series of scraping frameworks 10, 20 and suited to support in translation a device forming the support 107 of a product to be treated in the blasting assembly.

Preferably, the booth includes a pair of rails 70 on which a trolley 107 can travel.

Figure 7:
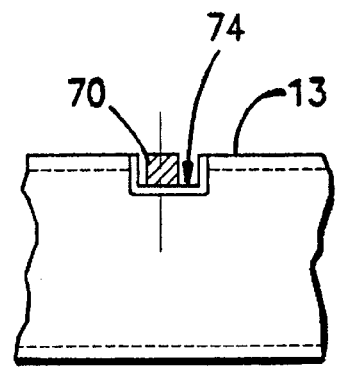
FIG. 7 is a sectional view taken along line VII—VII of FIG. 5.

As shown in FIG. 7, recesses 74 are provided on the upper part of the sections 13, 13a transversal to the rails 70 to allow the passage of the latter.

The booth 100 further includes on its front face an opening which can be closed in a conventional manner by a door 105. This opening is suited for the passage of the trolley 107 sliding on the rails 70. The booth can also include an opening on its rear face to allow the trolley 107 to pass through the booth, and possibly to transport the after-blasting product to another treatment station.

A supporting section 73 extends parallel to and between the girders 12 of each scraping framework 10, 20 of the first series of longitudinal frameworks. This supporting section 73 is suited to support a rail 70.

Figure 10:
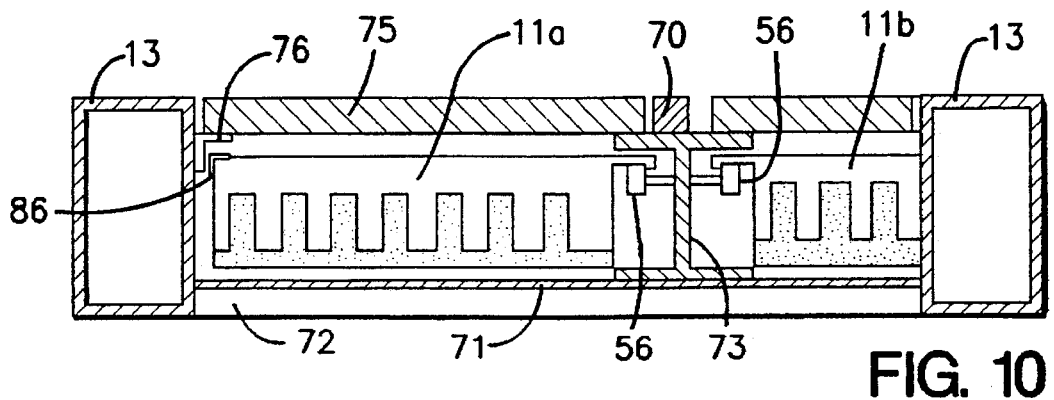
FIG. 10 is a truncated sectional view taken along line X—X of FIG. 5.

As shown in FIG. 10, this section 73 can have an I-shaped cross-section. The rails 70 thus supported are sufficiently distant from the floor to pass over the mobile scrapers 11, 14, 15 and not hinder their displacement.

Straight scrapers 11a and 11b extend in a transversal manner between an external section 13 and the supporting section 73 and between the other external section 13 and the supporting section 73, respectively.

The scrapers 11a and 11b are thus arranged on either side of the supporting section 73, the rollers 56 allowing the back-and-forth movement of the scrapers 11a and 11b joined to the girders 12 being fixed to the sections 13 and the supporting section 73, as previously described with reference to FIG. 3.

The scraping frameworks assembly can be covered with plates forming a lath floor 75 to allow the operators to move about inside the booth 100. Supporting elements 76 fixed to the uprights 13 make it possible to support this lath floor 75.

The floor 71 of the scraping frameworks includes protruding ribs 72 making it possible to reinforce the structure in the conventional manner.

Figure 8:
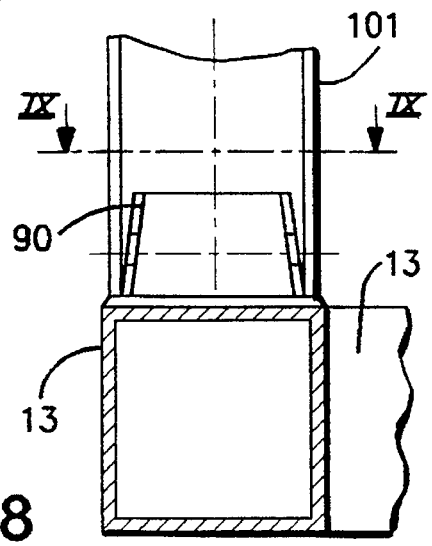
FIG. 8 is a partial sectional view taken along line VIII—VIII of FIG. 5.
Figure 9:
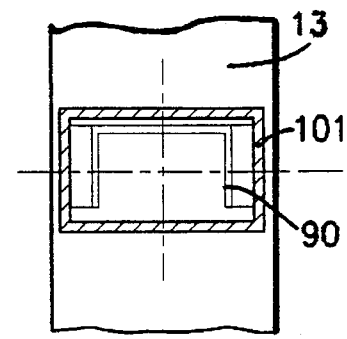
FIG. 9 is a partial sectional view taken along line IX—IX of FIG. 8.

As shown in FIGS. 8 and 9, the fixing means 90 fixing the booth 100 to the scraping frameworks 10, 20 and 30 consist of pieces with dog points 90 into which the uprights 101 of the booth 100 are driven in.

A screw-nut system makes it possible to rigidly join each upright 101 to a dog point 90, by passing a threaded pin through aligned bores formed in the upright 101 and the dog point 90, for example.

Obviously, the fixing means 90 can be of any type whatsoever.

Preferably, these fixings 90 are arranged in the four corners of the substantially rectangular booth.

Figure 12:
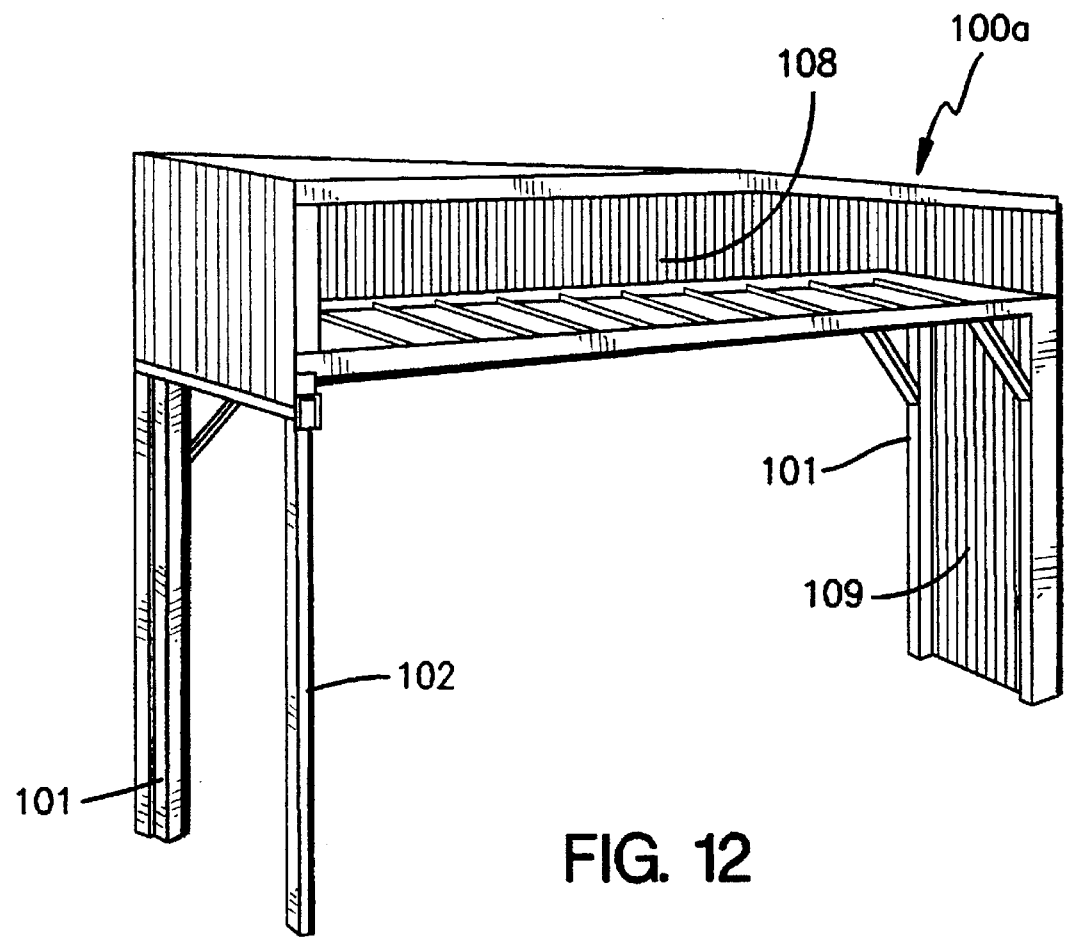
FIG. 12 is a perspective view of a cell of the booth of FIG. 11.

As shown in FIGS. 11 and 12, the booth 100 is made up of two substantially symmetrical parts 100*a* and 100*b*, each part including two uprights 101 suited to be fixed to the external sections 13 by the fixing means 90.

A temporary upright 102 is also provided on the front face of each portion of the booth 100*a* and 100*b*, where the door 105 is located. These uprights 102 are then removed when the two identical parts 100*a* and 100*b* of the booth are united along the longitudinal center axis of the booth 100.

The part of the booth 100*a* shown in FIG. 12 includes a plane rear face 109 and corresponds to an example of an embodiment in which the rails 70 do not pass through the booth 100.

However, if the rails 70 pass through the booth 100, the rear face 109 of each part of the booth 100*a* and 100*b* is similar to the front face and can also include a temporary upright 102.

In order to ease the transport, the uprights 101, 102 and possibly the rear face 109 can fold down beneath the upper part forming a roof of each part 100*a* and 100*b* of the booth.

The side walls, the doors 105 for the passage of the trolley 107 and the doors 106 for the entry of the operator are then fixed to the structure fixed to the external sections 13.

The entire booth 100 is sealed with a two layer cladding on these walls.

In the upper part of the booth 100, a coffer 108 makes it possible to house different devices such as lamps, ventilators, etc.

The cellular booth shown in FIG. 5 further comprises a preparation cell 80 into which opens the discharge end portion 31 of the second scraping framework 30, at the base of an elevator 40.

The granular material transferred can thus be recycled in this preparation cell 80. The latter also houses a control box 83 which incorporates the control and safety devices required for the operation of the entire cellular booth.

An area 82 can also be provided to store sand or shots within this preparation cell 80.

A sealed coffer 85 is suited to cover the discharge end portion 31 of the second scraping framework 30 extending between the opening 104 of the booth 100 and the preparation cell 80, in order to protect the second framework 30 from the weather outside.

This coffer 85 also serves as a brace when assembling the blasting assembly according to the invention.

Fixing means 84 make it possible to join the preparation cell 80, near its roof, to the booth 100, by means of fasteners 103 arranged on a side face of the booth 100 substantially above the opening 104 of the passage of the second scraping framework 30. These fixings 84 make it possible to stow the preparation cell 80 against the cell 100.

Obviously, the invention is not limited to the above example of an embodiment and many modifications can be applied to it without departing from the scope of the invention.

Thus, longitudinal scraping frameworks 10, 20 can supply the transversal scraping framework 30 through both sides, the bent scrapers 14 then having two second parts 51*b* of the armature joined to the ends of the first part 51*a* located substantially in the middle of the scraping framework 30.

Another booth 100 is then arranged after the first booth 100 so as to cover the other longitudinal frameworks 10, 20 arranged symmetric to the first with respect to the transversal scraping framework 30.

I claim:

1. A scraper (14) arranged between two parallel girders (12), comprising a metal truss (51) in the shape of a comb whose teeth (52) are directed downwards and a flexible blade (59) covering said teeth (52) and glued against one face of an upper crossbar (62) of the truss (51), characterised in that the metal truss (51) has a first part (51*a*) substantially perpendicular to said girders (12) and at least one second part (51*b*) joined to one end of the first part (51*a*) and forming an elbow with the first part (51*a*), the flexible blade (59) being glued against one face directed towards the interior of said elbow of the truss (51).

2. A scraper according to claim 1, characterised in that said first (51*a*) and second (51*b*) parts of the metal truss (51) form an obtuse angle (α).

3. A scraper according to claim 1, characterised in that the second part (51*b*) of the truss (51) has a flange (54) joined to its end opposite to said first part (51*a*), said flange (54) being parallel to the girders (12) and extending beyond the flexible blade (59).

4. A scraper according to claim 1, characterised in that the first (51*a*) and second (51*b*) parts of the truss (51) are in contact on a vertical plane (58) located between two teeth (52) of the comb.

5. A scraper according to claim 1, characterised in that the metal truss (51) in the shape of a comb has teeth (52, 53) at its ends.

6. A scraper according to claim 1, characterised in that the metal truss (51) also has a stiffening flange (60) which is substantially perpendicular to the upper crossbar (62) and extends over the edge of the flexible blade (59) adjacent to the upper crossbar of the truss.

7. A scraper according to claim 6, characterised in that the stiffening flange (60) has fixing means (57) fixing it to the parallel girders (12).

8. A scraper according to claim 1, characterised in that said first (51*a*) and second (51*b*) parts of the truss (51) form an obtuse angle (α) of approximately 150°.

9. A scraping framework (30) comprising two parallel girders (12) between which are arranged scrapers (14) in accordance with claim 1, performing a back-and-forth movement, the materials to be transferred being introduced laterally into said scraping framework (30), beneath at least one of the girders (12), characterised in that a second part (51*b*) of the elbowed truss (51) of each scraper (14) is adjacent to the girder (12) beneath which the materials to be transferred are introduced, with the face directed towards the interior of said elbow of the truss (51) facing the materials discharge end (31) of said framework (30).

10. An installation for the transfer of materials, in particular granular or pulverulent blasting materials, comprising a first series of parallel scraping frameworks (10, 20) including two parallel girders (12) which perform a back-and-forth movement and between which straight scrapers (11, 15) are arranged transversally, and a second scraping framework (30) in accordance with claim 9, characterised in that the scraping frameworks (10, 20) of said first series open laterally into the second scraping framework (30), the straight scrapers (11, 15) of the first series of scraping frameworks (10, 20) having a straight metal truss in the shape of a comb whose teeth are directed downwards, a flexible blade (59) covering said teeth and glued to one face of an upper crossbar of the truss, and a stiffening flange (60) substantially perpendicular to the upper crossbar and extending opposite to the flexible blade (59) in the end scrapers (15) arranged facing the second scraping framework (30).

11. An installation according to claim 10, characterised in that the second scraping framework (30) opens into the base of an elevator (40) and also has a materials discharge end portion (31), a series of straight scrapers (16, 17) including a metal truss in the shape of a comb with its teeth directed downwards, a flexible blade (59) covering said teeth and glued against one face of the upper crossbar of the truss, and a stiffening flange (60) substantially perpendicular to the upper crossbar.

12. An installation according to claim 11, characterised in that the end scraper (17), located at the end (31a) of the materials discharge end portion (31) of the second scraping framework (30), has a stiffening flange (60) extending opposite to the flexible blade (59) and in that the truss (51) of said end scraper (17) comprises at its ends two flanges (61) parallel to the girders (12) and extending beyond the flexible blade (59).

13. A moveable cellular booth comprising a materials transfer installation according to claim 10, the scraping frameworks (10, 20) of said first series and said second scraping framework (30) including fixed external sections (13) between which said girders (12) extend parallel to one another, characterised in that said external sections (13) include fixing means (90) suited to fix in a releasable manner said booth (100) extending above said scraping frameworks (10, 20, 30), said booth (100) including an opening (104) suited for the passage of a discharge end portion (31) of the second scraping framework (30).

14. A cellular booth according to claim 13, characterised in that it includes at least one pair of rails substantially parallel to the girders (12) of the first series of scraping frameworks (10, 20) and suited to support in translation a device forming the support of a product to be treated in said blasting assembly.

15. A cellular booth according to claim 14, characterised in that a supporting section (73) extends parallel to and between said girders (12) of each scraping framework (10, 20) of said first series, said supporting section (73) being suited to support a rail, and in that straight scrapers (11a, 11b) extend in a transversal manner between an external section (13) and said supporting section (73) and between the other external section (13) and the supporting section (73), respectively.

16. A cellular booth according to claim 13, characterised in that the booth (100) is made up of two substantially symmetrical parts (100a, 100b), each part (100a, 100b) including two uprights (101) suited to be fixed to the external sections (13) by said fixing means (90).

17. A cellular booth according to claim 13, characterised in that it further comprises a preparation cell (80) into which opens the discharge end portion (31) of the second scraping framework (30), at the base of an elevator (40).

18. A cellular booth according to claim 17, characterised in that a sealed coffer (85) is suited to cover said discharge end portion (31) of said second scraping framework (30) extending between the opening (104) of the booth (100) and the preparation cell (80).

* * * * *